United States Patent [19]
Schuss

[11] 3,781,161
[45] Dec. 25, 1973

[54] CONTROL LOGIC TEST CIRCUIT

[75] Inventor: Jack Ascher Schuss, West Hartford, Conn.

[73] Assignee: Combustion Engineering, Inc., Windsor, Conn.

[22] Filed: Jan. 3, 1972

[21] Appl. No.: 214,877

[52] U.S. Cl.................... 431/16, 431/26, 431/189
[51] Int. Cl............................................ F23n 5/24
[58] Field of Search.................. 431/14, 15, 16, 24, 431/26, 25

[56] References Cited
UNITED STATES PATENTS

| | | | |
|---|---|---|---|
| 2,751,972 | 6/1956 | Loeber | 431/26 |
| 3,008,517 | 11/1961 | Pierz | 431/16 |
| 3,123,027 | 3/1964 | Livingston | 110/28 |
| 3,258,053 | 6/1966 | Schuss | 431/29 |
| 3,684,423 | 8/1972 | Bryant | 431/24 |

*Primary Examiner*—Carroll B. Dority, Jr.
*Attorney*—Eldon H. Luther et al.

[57] ABSTRACT

Means are provided for rapidly, completely, and substantially automatically checking the integrity of the logic and related circuitry employed to control and direct the initiation and termination of combustion at elevations of burners in a furnace. The existing burner control logic is utilized in the generation of substantially all of the input signals to remaining logic under test. The driven devices, such as burner guns, fuel valves, etc., are prevented from responding to their command signals supplied by the control logic. These command signals appearing at the outputs from the control logic system are indicative of proper operation of the logic required to produce them. The feedbacks to the control logic from the sensing devices associated with the driven devices are operative to indicate the fact that the disabled driven devices have not responded correctly to input commands during startup and to effect the necessary commands resulting in a shutdown sequence of the control logic. Means are provided for simulating the two or three signals required for proper sequential operation of the logic which fail to appear when the existing logic is operated in a test mode.

11 Claims, 6 Drawing Figures

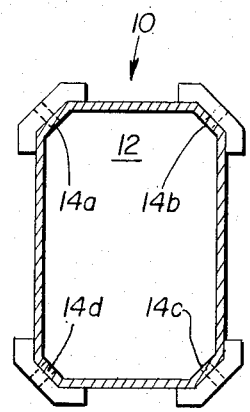
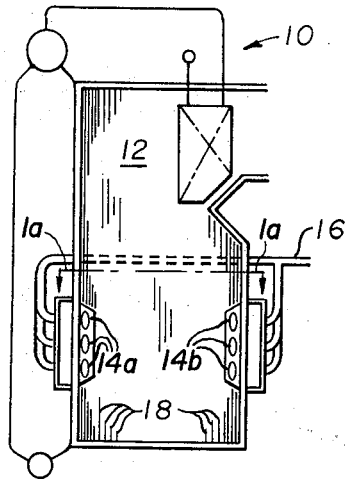
FIG. 1a          FIG. 1
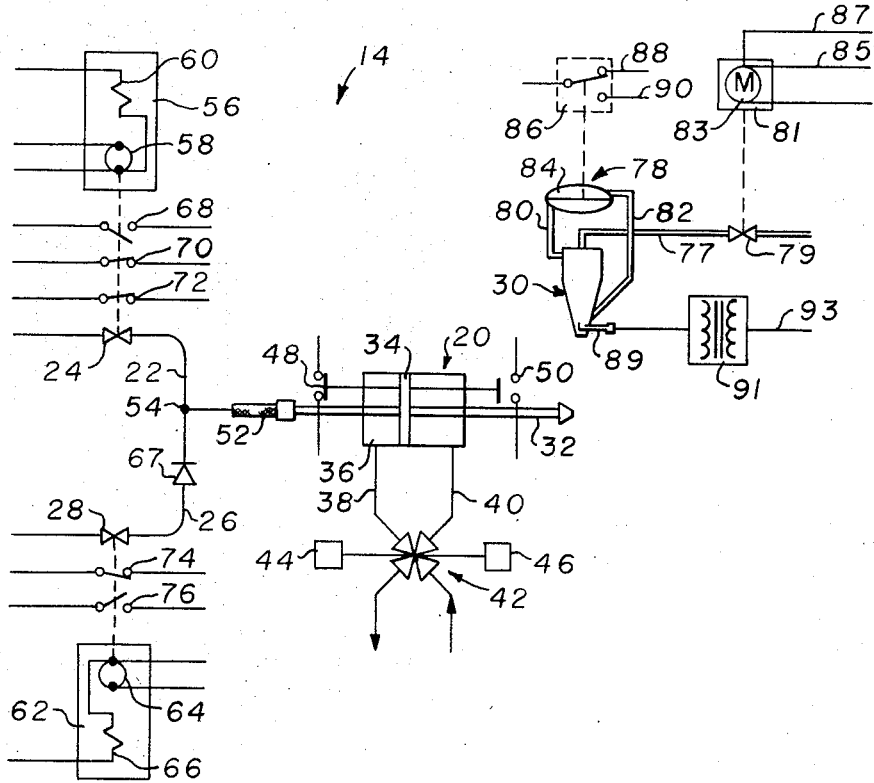
FIG. 2

CONTROL LOGIC TEST CIRCUIT

BACKGROUND OF THE INVENTION

A large variety of processes are controlled using automatic or semi-automatic techniques. Such automated techniques rely upon various nonhuman means for implementing the process according to a particular logic pattern. The means comprising and for controlling the system logic may in some instances be initially defective or may fail at some later time, thus impairing control of the process.

In many such process control systems economics, time and safety factors will permit detection and replacement of defective components in a relatively leisurely manner. However in other instances because of considerations of safety and/or the cost of system inoperability, means must be provided for maintaining a close check on the integrity of the system elements which direct the pattern of operation of the process.

In a system for controlling the combustion of a fuel, as in the furnace of a large steam generator, it is generally necessary to detect and repair any defects in the controls as rapidly as possible to prevent costly shutdowns and to insure availability for startup. In some situations, certain defects might permit a potentially explosive condition to be created within a furnace. Control systems exist for automatically controlling the various driven devices of a burner such as ignitors, burner guns, and fuel valves in a manner determined by system logic. Generally the driven devices are controlled to initiate combustion at the burner within a predetermined time span and upon satisfaction of certain first conditions in response to a start command and to terminate combustion within a predetermined time span and upon satisfaction of certain other conditions in response to a stop or shutdown command. Sensing means determine the state of activity or operation of the various driven devices and this information is fed back to the logic of the control system. The system logic may include means for generating a stop command to effect the combustion termination process when a particular state of activity consistent with combustion is not attained at one or more of the driven devices at the expiration of the start time span.

The various elements which comprise the control system logic for a steam generator, particularly those for controlling initiation and termination of combustion, have heretofore been tested or checked by simulating various input signals to all or most of the logic elements individually and noting the output response of each logic element. The actual feedback signals from controlled or driven devices have been disconnected so as not to interfere with the multitude of simulated input signals. While such a checking arrangement is capable of accurately checking all or most of the logic elements, it is quite expensive to provide and time consuming to operate. Further, the increased use of solid state circuitry often does not permit ready access to each logic element for testing.

SUMMARY OF THE INVENTION

According to the invention, means are provided for rapidly checking the integrity of the logic and related circuitry employed to control and direct the operation of the driven devices of a steam generator burner. A control logic checking circuit is provided which is relatively simple and inexpensive, is readily adaptable to existing burner control logic and is particularly suited for use with solid state logic. The circuit allows automatic exercising of the logic through both the combustion "initiate" or "startup" mode and the combustion "terminate" or "shutdown" mode as a complete cycle, requiring little time and a minimum of manual intervention.

The checking circuit of the invention is designed to be operated when a burner and its logic are in a shutdown condition and are not presently being used in the combustion control process. During the checking operation the burner in no way contributes to or interferes with existing conditions of combustion within a furnace. A single switch in the electrical power circuit to all of the various driven devices of a burner prevents response of the devices to the drive commands occurring at the outputs of the control logic during the test or check mode of operation. The feedbacks from the various sensing means associated with the driven devices continue to provide information to the logic during operation in the test mode and indicators activated by the presence of drive commands at the control logic outputs inform the operator of the operability or inoperability of that logic required to provide a particular drive command. A minimal number of simulated signals are required for completely automatic exercising of the control logic in the test mode. The actual signals generated by individual control and logic circuits under test are utilized as inputs to other control and logic circuits being tested, thus minimizing the need for manual simulation of signals.

In a preferred embodiment of the invention, the plural burners of a furnace elevation are operated as a unit with both combustion initiation and termination at and by the several burners being accomplished in a sequential manner by control logic requiring a single start or stop command. The control logic is comprised of low voltage solid state circuitry and the driven devices are powered by a higher voltage source. The control logic checking circuit requires but a single switch in the high voltage power line to all of the driven devices to prevent their response to drive commands and only two or three simulated signals need be generated for a test sequence in order to have proper automatic sequential exercise of the entire control logic through a complete startup and shutdown cycle.

BRIEF DESCRIPTION OF THE DRAWINGS

FIG. 1 is a diagramatic illustration of a vapor generator capable of employing the present invention.

FIG. 1a is a sectional plan view of the vapor generator of FIG. 1 taken along line 1a–1a.

FIG. 2 is a schematic illustration of a typical automatically operated burner arrangement according to the invention.

DESCRIPTION OF THE PREFERRED EMBODIMENT

Figure 3A:
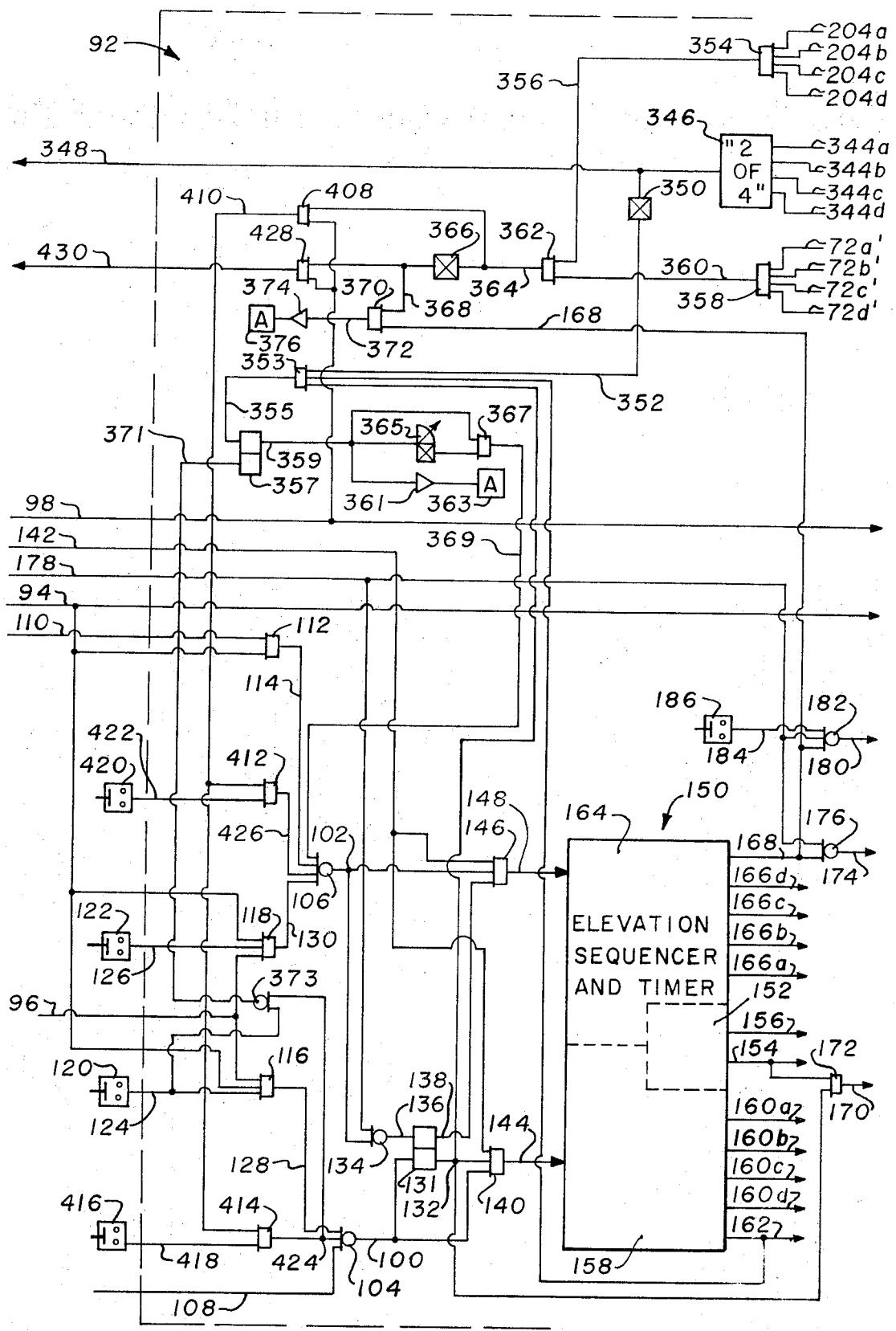
FIG. 3a is a schematic diagram of a portion of the burner control system of the present invention common to a plurality of burners.

Referring now to FIG. 1 there is shown in diagramatic form an elevational section of a vapor generator 10 having a furance chamber 12 in which the invention and its preferred embodiment is designed to operate. A plurality of main burners 14 are arranged in four corners of the chamber 12 for discharging and burning streams of fuel supplied thereto through a main fuel supply line 16 in the furnace chamber. In the illustrated embodiment there are three elevations of burners each consisting of four burners, 14a, 14b, 14c and 14d with a burner located at each of the four corners of the furnace chamber 12. The walls of the furnace chamber 12 are lined with vapor generating tubes 18 which are in heat exchange relation with combustion gases rising within the furnace chamber 12 and serve to generate and supply vapor to a load in a well known manner. The amount of vapor created in the generator can be grossly controlled by the number of burners 14 placed in operation to compliment the analog controls operating upon the main control valve in the main fuel supply line 16. Generally, the burner elevations are adapted to be operated either singly or together depending on the desired generator output.

While the test circuitry of the invention might be described in connection with control systems for controlling a variety of processes, and particularly in conjunction with controls for the burners in steam generating units which employ any of a variety of fuels, such as coal, gas or oil for combustion, the preferred embodiment will describe the invention in association with the controls for effecting startup and shutdown of an elevation of burners in a vapor generator which uses oil as its principle fuel. The test circuit of the invention is particularly suited to the burner controls for an oil fired vapor generator because of the relatively large number of electrically actuated means directly associated with controlling initiation and termination of the combustion process at each burner.

Going now to FIG. 2, each fuel burner 14 will be considered as an arrangement including an oil gun 20, a fuel supply conduit 22 which includes fuel supply valve 24 connected between the main fuel supply line 16 and the gun 20, a fluid conduit 26 including valve 28 connected between a purging medium such as steam (not shown) and gun 20, and an ignitor torch 30 disposed to ignite fuel issuing from gun 20. A general description of the burner arrangement employed in the preferred embodiment will be provided hereinafter; however, a more detailed description of such a burner arrangement may be found in U. S. Pat. No. 3,258,053 to Schuss.

Oil gun 20 includes a barrel 32 which is attached to and carried by a piston 34 slidably mounted in cylinder 36. Cylinder 36 is fluidly connected to a source of pneumatic power (not shown) by fluid lines 38 and 40 and a dual solenoid operated four-way valve 42, the solenoid 44 being actuable to admit pneumatic fluid to cylinder 36 behind piston 34 to extend barrel 32 of fuel gun 20 to its operable position and solenoid 46 being actuable to admit pneumatic fluid to cylinder 36 in front of piston 34 to retract barrel 32. Also associated with fuel gun 20 are limit switches 48 and 50. Limit switch 48 is normally open and the contacts are closed only when oil gun 20 is fully retracted. Limit switch 50 is normally open and the contacts are closed only when oil gun 20 is fully extended. A flexible fluid conducting sleeve 52 fluidly connects gun 20 with fuel conduit 22 and purging conduit 26 through junction 54.

Fuel conduit 22 includes a valve 24 in series therewith and operated by operator 56 which includes motor 58 and solenoid 60. Motor 58, when energized, operates to open valve 24 and solenoid 60, when energized, operates to permit closure of valve 24 in a manner described in said U. S. Pat. No. 3,258,053.

Conduit 26 for the purging medium includes valve 28 which is operated by operator 62 including motor 64 and solenoid 66 which function in the same manner as for the above described valve 24 and operator 56, i.e. motor 64 opens the valve and solenoid 66 closes it. A check valve 67 is interposed in conduit 26 downstream of valve 28 to assist in preventing fuel backup into conduit 26.

Limit switches 68, 70 and 72 are associated with valve 24 such that the contacts of switch 68 close only when valve 24 is fully open, the contacts of switch 70 are normally closed and open only when the valve is fully open, and the contacts of switch 72 close only when the valve is fully closed.

Limit switches 74 and 76 are associated with valve 28 such that the contacts of switch 74 are closed only when valve 28 is fully closed and the contacts of switch 76 are closed only when valve 28 is fully open.

An ignitor torch 30 is associated with each oil gun 20 and is operated by a separate source of fuel supply (not shown) connected to torch 30 by conduit 77 which includes valve 79. Valve 79 is operated by valve operator 81 which includes a reversible motor 83. Motor 83 operates to open valve 79 when lead 85 connecting motor 83 is energized and the motor operates to close valve 79 when lead 87 connecting the motor is energized. A source of heat, such as spark plug 89, is electrically connected to transformer 91 and is excited by energizing conductive lead 93 to the transformer. Spark plug 89 ignites torch 30 when the fuel issues from oil gun 20.

In the instant arrangement, an ignitor monitor 78 is operably associated with ignitor torch 30 to indicate the torch's ability to supply sufficient ignition energy to ignite the fuel that issues from its associated gun 20. The contemplated ignitor monitor 78 is as described in detail in U. S. Pat. No. 3,123,027 to Livingston. It comprieses a pair of pressure taps 80 and 82 which, in association with a pressure differentiating chamber 84, measure the pressure differential existing within torch 30 at spaced points therealong. This pressure differential is indicative of the amount of ignition energy the ignitor 30 is capable of delivering.

A $\Delta p$ switch 86 having output terminals 88 and 90 is arranged such that when less than a predetermined pressure differential is evidenced within chamber 84 of monitor 78, a contact is closed to complete a circuit to output terminal 88 to indicate a condition of "insufficient" ignitor energy and when the pressure differential is greater than the predetermined pressure differential a contact is closed to complete a circuit to output terminal 90 to indicate a condition of "sufficient" ignitor energy.

In the normal operation of most vapor generators an entire elevation of burners 14 is introduced into or removed from service as load demand requires. A burner control system employing the checking circuit of the invention is employed for controlling the startup and shutdown of each elevation of burners. A separate combustion control system, not forming part of the invention, is used to modulate fuel and air flow during continuous operation of the burners 14 in an elevation.

Figure 3B:
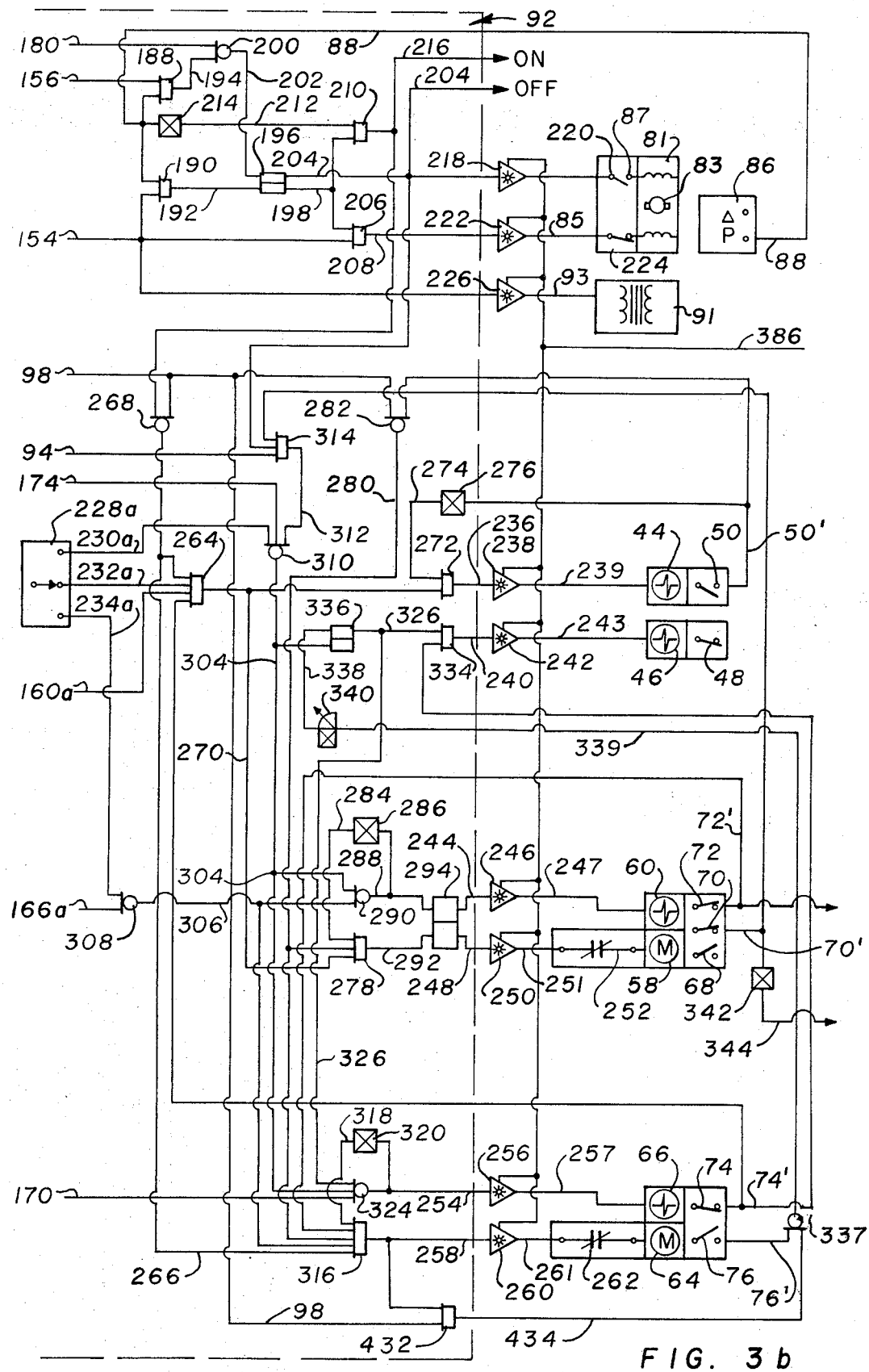
FIG. 3b is a schematic diagram of another portion of the burner control system of the present invention applicable to an individual burner.

FIGS. 3a and 3b are schematic diagrams of burner control system 92 used to control the startup and shutdown of a burner elevation. More specifically, FIG. 3a depicts, in diagramatic form, that part of the control system which is responsible for coordinating and directing the startup and shutdown procedures for the four burners 14a, 14b, 14c and 14d which typically comprise a burner elevation. The control arrangement is such that combustion is initiated or terminated at each of the four burners in a predetermined sequence. FIG. 3b depicts a portion of the burner control system 92 which is associated entirely with a single burner, 14a, but which is repeated identically in each of the other three burners in an elevation. In FIG. 3a, those signals which are associated only with a particular burner are given the alphabetical subscript of the corresponding burner.

Speaking very generally, the startup of a burner 14 to place it in operation within a furnace 12 requires ignition of torch 30 followed by extension of oil gun 20 and finally, opening of the main fuel valve 24. The ignitor torch 30 may at some later time be extinguished.

The general procedure for "shutdown" or termination of combustion at a burner 14 includes ignition of torch 30 followed in a sequence by closure of main fuel valve 24, opening of purge valve 28, closure of purge valve 28, and retraction of oil gun 20. The torch 30 is then extinguished.

The procedure for burner shutdown in the event of a dangerous condition, such as loss of water circulation in vapor generator 10, is termed a "trip" and generally includes prompt and substantially concurrent extinguishing of torch 30 and closure of valves 24 and 28 if either is open.

The control circuitry 92 of FIGS. 3a and 3b may be comprised substantially entirely of electro-mechanical control and logic elements, however recent developments in solid state logic suggest a control system employing solid state circuitry, at least to perform the logic functions. Solid state components are more compact than relays and the like and are usually affected to a lesser extent by adverse conditions of the operating environment. The solid state circuitry generally operates at low voltage levels (3-24V); however various input signals may be generated from a high voltage supply (110V). In the instances in which signals of different voltages are to be interfaced, a signal converter may be required to step up or step down the signal voltage. The logic elements of control system 92 operate in a binary digital manner and FIGS. 3a and 3b will be described accordingly. Control system 92 may be viewed as comprising a decision logic section and start and stop command signal means for affecting the startup and shutdown exercises respectively of the decision logic.

Referring now to FIG. 3a, a signal 94 indicative of remote operational control is provided as an input to control system 92. Signal 94 signifies operation of the burner control system from a remote position, such as a control room, and permits automatic remote exercise or utilization of control system 92. Signal 96 is generated at the above mentioned remote position and permits initiation of individual elevation startup or shutdown by an operator stationed at the console in the control room.

Signal 98, to be described in greater detail below, serves to lock out or prevent operation of the burners 14 when the control system is exercised in a test mode in accordance with the invention.

It will be noted that the conductors carrying signals 94, 96 and 98, and in fact the remaining signals to be discussed in the case, are themselves designated 94, 96, 98, etc. respectively. It is felt that the designation of conductors by the signals carried is not only economical of drawing space, but lends clarity to the following description. Throughout the description of the preferred embodiment, it is intended that the stated presence of a signal shall mean the existance of a digital signal in the logical "1" state and that a logical "0" is present at all other times. In the few instances in which a signal is referred to in the logical "0" state, this fact is so indicated.

Start and stop command signals 100 and 102 respectively are the outputs of "or" gates 104 and 106 respectively. Start and stop command signals 100 and 102 respectively are utilized to initiate exercise of the "startup" and "shutdown" functions of the control system logic in the automatic and manual operational modes and in the test mode of the invention. In routine remote automatic operation, an automatic start signal 108 is remotely generated and is connected to an input of "or" gate 104 to provide start command signal 100. Correspondingly, an automatic stop signal 110 and remote operation signal 94 are connected to the two inputs of an "and" gate 112 to provide signal 114 when signals 94 and 110 are concurrently present. Signal 114 is applied as an input to "or" gate 106 to provide stop command signal 102.

In the remote operational mode, remote manual control may be exercised through control system 92. This may be necessitated by inoperability of the automatic central control facilities. In such instances, remote operation signal 94 and manual mode signal 96 are each applied to two of the three inputs to each of "and" gates 116 and 118. Start and stop push buttons 120 and 122 generate signals 124 and 126 respectively which are respectively applied to the remaining input to each of "and" gates 116 and 118. When signals 94, 96 and 124 are present concurrently, the output of "and" gate 116 is a signal 128 applied to an input of "or" gate 104 and when signals 94, 96 and 126 are present concurrently, the output of "and" gate 118 is a signal 130 applied to an input of "or" gate 106.

A bistable circuit element, such as flip-flop 131, is used to characterize operation of control system 92 in either a startup (or start) submode or a shutdown (or stop) submode within the earlier mentioned major modes. When a start command signal 100 occurs it is applied to one of the two inputs of flip-flop 131 and is effective to set the flip-flop in one of its two stable states, resulting in an output signal 132 which signifies operation in the "startup" submode. Correspondingly, when a stop signal 102 occurs, it is applied as an input to an "or" gate 134 to provide output signal 136 therefrom which is connected to the other input of flip-flop 131. Signal 136 is effective to reset the flip-flop to its other stable state, resulting in an output signal 138 which signifies operation in the "shutdown" submode.

Start command signal 100 is applied to one of the three inputs of "and" gate 140, startup submode characterizing signal 132 is connected to another of the inputs of the "and" gate, and an elevation permissives signal 142 is applied to the remaining input. Elevation permissives signal 142 exists in the logical "1" state when all general unit permissive conditions such as "furnace purge completed", "no boiler trip present", "adequate fuel header pressure available", etc. are satisfied. When signals 100, 132 and 142 are present concurrently, "and" gate 140 provides an output signal 144.

Correspondingly, stop command signal 102 is applied to one of the three inputs of "and" gate 146, shutdown submode characterizing signal 138 is connected to another of the inputs of the "and" gate, and the elevation permissives signal 142 is applied to the remaining input and an output signal 148 therefrom exists when the three input signals are present concurrently.

Elevation sequencer and timer 150 is comprised of a plurality of timing circuits internally programmed to provide various outputs at predetermined times following application of an input signal 144 or 148. The timing circuits of timer 150 preferably employ solid state components and may be any of several types well known in the art. Therefore, a detailed description of the circuitry internal to timer 150 will not be undertaken and instead the various outputs will be described in a manner which will make evident the characteristics and capabilities of timer 150. Typically, timer 150 might include several sequencers or programmers such as the Chronologics Model SP101 Programmer, each being responsive to or started by one or the other or both of signals 144 and 148. Each SP101 Programmer might provide one or several of the signal time sequences to be described below in response to a start signal, such as signal 144 or 148. The timing of each output signal provided by a Programmer will depend on its preset timing.

Sequencer and timer 150 may be divided into a first section 152 which is responsive to both input signals 144 and 148, to provide output signals 154 and 156, a second section 158 which is responsive only to input signal 144 to provide output signals 160a, 160b, 160c, 160d and 162, and a third section 164 which is responsive only to input signal 148 to provide output signals 166a, 166b, 166c, 166d and 168. Each section, 152, 158 and 164 of timer 150 might include one or more SP101 Programmers. The conductors carrying signals 144 and 148 will be connected such that both will provide start signals for the Programmer or Programmers forming section 152 of timer 150.

When either signal 144 or 148 is first applied to an input of timer 150, a timing sequence for startup or shutdown respectively of an entire burner elevation is initiated. An ignitor trial time signal 154 exists for the first 15 seconds following initiation of the sequence. Signal 156 appears at 15 seconds and indicates expiration of the ignitor trial time and continues until initiation of the next ignitor trial time signal 154.

If control system 92 is in the startup submode and signal 144 appears as an input to timer 150, burner start signals 160a, 160b, 160c and 160d will exist from 15 to 90 seconds, 30 to 90 seconds, 45 to 90 seconds, and 60 to 90 seconds respectively following initiation of the sequence. Signal 162 appears at the output of timer 150 at 90 seconds after signal 144 is applied as an input thereto and continues until a new startup or shutdown sequence is attempted in response to a new start or stop command signal 100 or 102.

Correspondingly, when the control system 92 is in the shutdown submode and signal 148 appears as an input to timer 150, burner purge signals 166a, 166b, 166c and 166d will exist from 15 to 145 seconds, 30 to 145 seconds, 45 to 145 seconds and 60 to 145 seconds respectively following initiation of the sequence. Signal 168 appears at the output of timer 150 145 seconds after signal 148 is applied as an input thereto and continues until a new startup or shutdown sequence is attempted in response to a new start or stop command signal 100 or 102.

Each burner start signal 160 and each burner purge signal 166 is responsible for initiating burner start and burner purge functions respectively in the particular burner arrangement 14 associated with the particular signal in the time sequence in which the signals appear. The ignitor trial time signal 154 is applied to all of the ignitors 30 in an elevation simultaneously as is also the ignitor trial time expired signal 156 immediately following termination of signal 154.

A purge valve trip signal 170 is provided as an output from "and" gate 172 upon the concurrent appearance at the two inputs thereof of startup submode signal 132 and ignitor trial time signal 154. Purge valve trip signal 170 is applied simultaneously to all burners in an elevation.

A burner trip signal 174 is provided as an output from "or" gate 176 upon the appearance at the inputs thereof of either signal 168 or a boiler trip signal 178. Boiler trip signal 178 will be initiated remotely either automatically or manually when a speedy termination of the combustion process is desired or required. Burner trip signal 174 is applied simultaneously to all burners in an elevation. Additionally, an ignitor trip signal 180 is provided as an output from "or" gate 182 upon the appearance at the inputs thereof of either signal 168, or boiler trip signal 178, or "ignitors off" signal 184. The "ignitors off" signal 184 is provided by a manually actuated push-button 186 which may be utilized at any time an ignitor trip is desired. Ignitor trip signal 180 is applied simultaneously to all ignitors 30 in an elevation.

Referring now to FIG. 3b, the logic circuitry associated with a particular burner arrangement 14 (e.g. 14a) is shown. Signal 88 arises from $\Delta P$ switch 86 when insufficient ignitor energy is present. Signal 88 is applied to one of the two inputs associated with each of "and" gates 188 and 190. Ignitor trial time signal 154 is applied to the other input to "and" gate 190 and ignitor trial time expired signal 156 is applied to the other input to "and" gate 188. Signal 192 results as an output from "and" gate 190 when "insufficient" ignitor energy exists to ignite fuel issuing from fuel gun 20 and the ignitor trial time occur concurrently. Correspondingly, a signal 194 results as an output from "and" gate 188 when "insufficient" ignitor energy exists and the ignitor trial time has expired.

Signal 192, when applied to flip-flop 196, sets the flip-flop to a state providing an output signal 198. Both ignitor trip signal 180 and signal 194 are applied as inputs to "or" gate 200, resulting in an output signal 202 when either is present. Signal 202 when applied to the other input of flip-flop 196 resets the flip-flop to provide an output signal 204. Signal 204 is used as an indication of ignitor "off". When signals 198 and 154 appear concurrently as inputs to "and" gate 206, an output signal 208 results therefrom. Signal 208 is present during the 15 seconds which ignitor trial time signal 154 exists if ignitor 30 is not producing sufficient ignition energy. Signal 198 is also applied as one of the two inputs of "and" gate 210. Signal 212 is the output from inverter 214 and is applied to the other input of "and" gate 210. Signal 212 will be in the logical "1" state only when signal 88 is not present as a logical "1" input to inverter 214. Therefore, signal 212 is indicative of a condition of "sufficient" ignitor energy. The output from "and" gate 210 is a signal 216 which signifies an "ignitor on" condition.

Signals 204, 208 and 154 represent output signals from control system 92 and are employed to direct the opening and closing of valve 79 in the fuel supply conduit 77 to ignitor torch 30 and the excitation of transformer 91. Signal 204 acts, through means such as AC switch 218, to be described in greater detail below, to provide a motor driving AC potential to lead 87. A limit switch 220, not previously shown, is connected in series with lead 87 between AC switch 218 and motor 83. Limit switch 220 is normally closed and is associated with valve 79 in such a manner that it is opened only when the valve is closed. Thus, when signal 204 is present as an output from control system 92 and, through AC switch 218 and limit switch 220, applies an AC driving potential to lead 87, the motor will be energized to close valve 79. Signal 208 is also an output from control system 92 and is applied to AC switch 222. Signal 208 acts through switch 222 to provide an AC driving potential to lead 85 which in turn is applied to motor 83 to open valve 79. Normally closed limit switch 224, not previously shown, is located in series with lead 85 and is associated with valve 79 such that it is opened only when the valve is fully open.

Signal 154 also is present as an output from control system 92 and is applied to AC switch 226 to provide an AC energizing potential to lead 93 connected to the primary of ignitor transformer 91.

As with the ignitor 30 associated with a burner arrangement, the other driven devices making up the burner also respond to output signals from control system 92. An output signal 236 from control system 92 is applied to AC switch 238 and acts to apply an AC driving voltage to solenoid 44 through lead 239 to extend fuel gun 20. Correspondingly, an output signal 240 from control system 92 is applied to AC switch 242 and acts to apply an AC driving voltage to solenoid 46 through lead 243 to retract fuel gun 20.

Output signal 244 from control system 92 is applied to AC switch 246 and acts to apply an AC driving voltage to solenoid 60 through lead 247 to close fuel valve 24. Correspondingly, output signal 248 is applied to AC switch 250 and acts to apply an AC driving voltage to motor 58 through lead 251 to open the fuel valve. A normally closed limit switch 252, not previously shown, is placed in series with the AC voltage supply to motor 58 and is adapted to be opened only when fuel valve 24 is fully open.

Output signal 254 from control system 92 is applied to AC switch 256 and acts to apply an AC driving voltage through lead 257 to solenoid 66 to close burner purge valve 28. Correspondingly, output signal 258 is applied to AC switch 260 and acts to apply an AC driving voltage through lead 261 to motor 64 to open the burner purge valve. A normally closed limit switch 262, not previously shown, is placed in series with the AC voltage supply to motor 64 and is adapted to be opened only when purge valve 28 is fully opened.

The limit switches associated with fuel gun 20, fuel valve 24, and purge valve 28 have been previously described and the conductors which carry the resulting logic signals to the decision logic of control system 92 are designated by the primed designation for the corresponding limit switches and will, as hereinbefore, be used to indicate the existance of a digital signal in the logical "1" state. In this embodiment, the logical "1" signal state occurs when the associated switch is closed.

The burner arrangement depicted in FIG. 3b has arbitrarily been chosen as that of burner arrangement 14a and accordingly receives burner start signal 160a and burner purge signal 166a. A local control switch 228a is associated with each particular burner arrangement, in this instance burner 14a, and may be manually controlled to provide signal 230a when a rapid shutdown of the burner is desired or signal 234a when a locally initiated purge of 14a is intended. Signal 232a is provided when remote rather than local control of the burner is required.

An "and" gate 264 has connected thereto, as inputs, burner start signal 160a, signal 74' indicative of a closed burner purge valve, signal 232a indicating remote operation of burner arrangement 14a, and signal 266 which is the output from "or" gate 268. Signal 216 which signifies an "ignitor on" condition is applied as an input to "or" gate 268 to provide signal 266. The output of "and" gate 264 is a signal 270 which exists while, concurrently, the burner purge valve is closed, an indication of "ignitor on" exists, local control switch 228a permits remote operation and a burner start signal 160a for this burner arrangement 14a exists.

Signal 270 is connected as one of the two inputs to "and" gate 272, the other input being signal 274. Signal 274 is the output of an inverter 276 which has as its input signal 50' from limit switch 50. Signal 274 exists in the logical "1" state when a logical "0" is present at the input to the inverter 276 or, in other words, when switch 50 is open and signal 50' is in a logical "0" state. When both signals 270 and 274 are present as inputs to "and" gate 272, control system output signal 236 results as the output therefrom.

Signal 270 is also applied as one of the three inputs to "and" gate 278, the other two inputs being signals 280 from "or" gate 282 and signal 284 from inverter 286. Signal 50' is connected as an input to "or" gate 282 to provide output signal 280 when fuel gun 20 is extended and limit switch 50 is closed. Signal 284 is the inverse of signal 288 discussed below and applied as the input to inverter 286. The output of "and" gate 278, signal 292, when first applied to an input of flip-flop 294 sets the flip-flop to a state which provides, as an output therefrom, control system output signal 248. Signal 288 is also connected to the other input of flip-flop 294 and, when occurring, resets the flip-flop to provide, as an output, control system output signal 244.

The output signal 288 from "or" gate 290 results when either one of the two signals 304 and 306 is present at the input to the gate. Signal 306 is the output of "or" gate 308 which has as its inputs burner purge signal 166a and local purge signal 234a. Signal 304 is the output of "or" gate 310 which has as its inputs burner trip signal 174, locally generated trip signal 230a and signal 312. Signal 312 is the output of "and" gate 314 which has as its three inputs "remote" signal 94, signal 204 indicating an "ignitor off" condition and signal 70' which exists whenever fuel valve 24 is not fully open.

Signal 306, which is required to effect purging of the burner, is applied as one of the five inputs to "and" gate 316. The remaining four inputs to the "and" gate are signals 266, 280, 72' and 318. Signal 318 is the output of inverter 320 which has as its input, control system output signal 254. Signal 254 is provided by "or" gate 324 having as inputs, purge valve trip signal 170, signal 304, and signal 326 described below.

Control system output signal 240 which commands the retraction of fuel gun 20 is the output of "and" gate 334. The two inputs to "and" gate 334 are signals 74' and 326. Signal 74' will exist during such time as burner purge valve 28 is closed and signal 326 occurs as an output from flip-flop 336. Flip-flop 336 is set to the state which provides signal 326 when signal 338 is first applied to an input thereof and is reset when signal 304 is applied to the other input thereof. Signal 338, which sets flip-flop 336, is the output from time delay element 340. Delay element 340 is of the type which provides a logical "1" signal at its output some delayed time, here 60 seconds, following the appearance of a logical "1" signal at the input thereto. The output of element 340 goes immediately to the logical "0" state when the logical "1" at the input is replaced by a logical "0". The input to delay element 340 is the output signal 339 from "or" gate 337. An input to "or" gate 337 is provided by signal 76' from limit switch 76. Signal 339 will appear as a logical "1" when purge valve 28 is fully open. Thus, set signal 338 appears at the input to flip-flop 336 some 60 seconds following full opening of purge valve 28.

The various stages of actuation or positioning of ignitor 30, burner gun 20, fuel valve 24, and purge valve 28 are indicated by the various sensing means, such as the Δ P switch and the limit switches, associated therewith. These indications may function as permissives, required as a prerequisite to actuation of a particular portion of the burner arrangement and they may also function to indicate failure of a particular driven device to achieve a desired state. Signal 70', which indicates that its associated fuel valve 24 is not open, is applied as an input to an inverter 342 to provide output signal 344. Signal 344 is then in the logical "1" state when the fuel valve is open and serves as an indication of such.

Referring back to FIG. 3a, signals 344a, 344b, 344c and 344d, each indicative of a fuel valve "open" condition are applied as inputs to a conventional "2 out of 4" voting circuit 346. Voting circuit 346 is of a type which provides a logical "1" output signal 348 whenever at least two out of the four input signals are in the logical "1" state. Another way of stating it, signal 348 exists when at least two of the four fuel valves 24 in an elevation are indicated as being open.

Signal 348 may be used to signify that an elevation is in service if an indication that "2 out of 4" fuel valves are open is established as being determinative of elevation operation. However, the condition of the fuel valves at the end of the startup sequence has also been selected as a means for indicating unsuccessful startup and signal 348 is applied to inverter 350 to provide an output signal 352 which is in the logical "1" state whenever at least "3 out of 4" of the fuel valves are not open.

As "2 out of 4" fuel valves open indicates that an elevation is properly in service, signal 352 indicating at least "3 out of 4" fuel valves not being open is utilized to initiate shutdown of the elevation. Signal 352, signal 162 indicating the lapse of 90 seconds in the startup sequence, and signal 132 indicating operation in the startup submode are applied as the three inputs to "and" gate 353 to provide output signal 355. Signal 355 then will appear at the end of the startup sequence if three or four of the fuel valves have not opened. Signal 355 is applied as an input to flip-flop 357 and its appearance thereat sets the flip-flop, providing output signal 359 therefrom. Signal 359 is thus indicative of an unsuccessful startup and acts through amplifier 361 to energize an alarm or annunciator 363.

Signal 359 additionally acts in a known manner through time delay inverter 365 and "and" gate 367 to provide a signal 369 which is relatively short in duration and is indicative of the unsuccessful startup. Signal 369 appears as a pulse and is applied as one of the inputs to "or" gate 106 responsible for initiating the shutdown sequence. Flip-flop 357 is reset by the appearance of signal 371 at its other input. Signal 371 is an output from "or" gate 373, one input to which is the manually generated start signal 124.

Signals indicating the ignitor "off" condition from each of the individual ignitors 30 in an elevation and signals indicative of the fuel valve closed condition from each individual fuel valve 24 in an elevation are also fed back to control system 92 for indication and control purposes. Signals 204a, 204b, 204c, and 204d, each indicative of the ignitor "off" condition of an ignitor in the elevation, are applied to the four inputs of "and" gate 354 to provide an output signal 356 when all four ignitors are "off". Signals 72a', 72b', 72c' and 72d', each indicative of the fuel valve closed condition of a fuel valve in the elevation, are applied to the four inputs of "and" gate 358 to provide an output signal 360 when four fuel valves are closed.

Both signals 356 and 360 are provided as the two inputs to "and" gate 362 providing an output signal 364 when all of the fuel valves are closed and all of the ignitors are "off". Signal 364 is further applied to an inverter 366 and inverted to provide output signal 368 which will appear in the logical "1" state at any time one or more of the ignitors is not "off" or the fuel valves are not closed. Signals 368 and 168 are applied as the two inputs to "and" gate 370 which provides an output signal 372 when, in the shutdown submode, 145 seconds have elapsed since the start of the shutdown sequence and at least one of the ignitors remains "on" or one of the fuel valves remains open. Signal 372 is applied to an amplifier 374 and the amplified signal acts to energize an alarm or annunciator 376.

Thus far, a control system and associated burner elements have been described which provide for remote automatic or manual startup and shutdown of the burners within an elevation of burners in a furnace. Also described as part of the control system have been means for initiating automatic shutdown of the entire elevation in the event of an unsuccessful startup. The test circuit of the invention, to be described hereinafter, provides means for completely and automatically exercising the logic of control system 92 substantially as hereinbefore described. Indicators, activated by each of the control system output signals 204, 208, 154, 236, 240, 244, 248, 254 and 258 associated with each burner in an elevation, provide an indication of whether or not a particular control system output signal does in fact occur as an output from control system 92. If activation of an indicator fails to occur when expected, it is taken as an indication of a failure in the control system prior to that point in the sequence and conventional, analytical repair techniques may be employed to correct the defect. However, the aforementioned exercising of control system 92 for circuit testing purposes will normally be undertaken when the particular elevation of burners associated therewith is not in service. Under these circumstances, it is desirable that the logic of system 92 be exercisable but that the driven elements of a fuel burner arrangement 14 be prevented from operating in response to the control system output signals. According to the invention, a control system test circuit is provided which permits exercise of the control system in a natural manner without actuating the driven devices associated with a burner. The existing logic is utilized to generate input signals to subsequent logic under test with a minimum of signal simulation and human participation.

Figure 4:
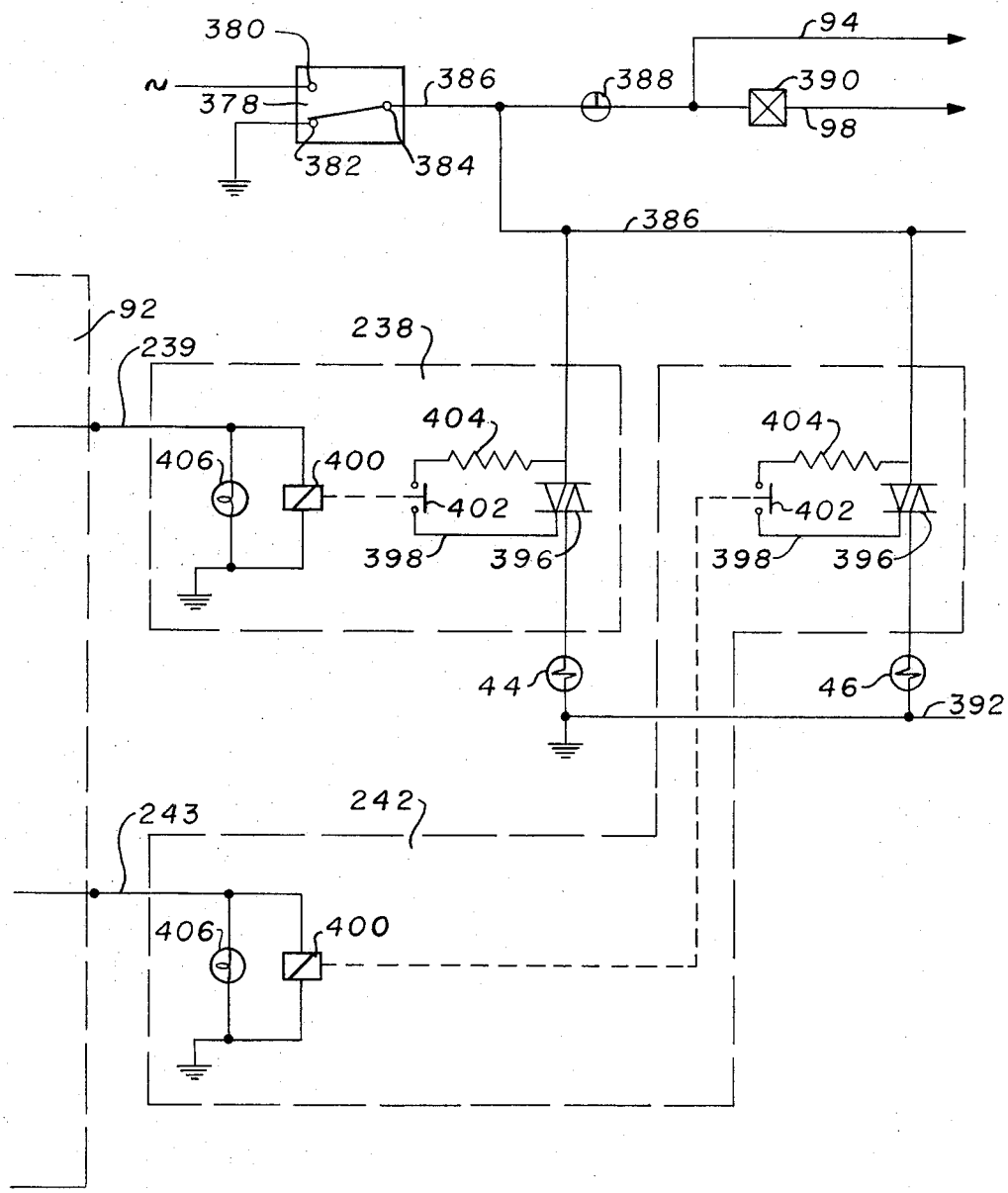
FIG. 4 is a schematic diagram of a portion of the burner control system which provides operation in a test mode.

When it is desired to perform a test of the circuitry of control system 92, the particular elevation of burners associated therewith will be placed in the shutdown condition. A "lock-out" switch 378, seen in FIG. 4, is associated with each elevation of burners in furnace 10. This switch will normally be located in proximity to the circuitry of control system 92 and not necessarily in the central control location. Switch 378 is comprised of a single pole double throw switch having terminals 380, 382, and 384. An AC supply voltage (typically 115V) is connected to terminal 380. Terminal 382 will be connected to ground and terminal 384 is connected with an output conductor 386. When the contacts of switch 378 close the circuit between terminals 380 and 384, the AC potential is applied to conductor 386 and when the contacts close the circuit between terminals 382 and 384 output conductor 386 will be at ground potential. The position of switch 378 in which the AC potential is applied to conductor 386 has been termed the "remote" position and the position which grounds conductor 386 has been termed the "lock-out" position.

Conductor 386 is connected to a signal conditioner 388 which converts an AC voltage to a low voltage DC signal as required for the logic elements of control system 92. The output of signal conditioner 388 is "remote" signal 94, previously mentioned. "Remote" signal 94 will be in the logical "1" state when switch 378 is in the "remote" position and in the "0" state when it is in the "lock-out" position. Signal 94 is connected as an input to inverter 390 to provide an output signal 98 which is a logical "1" when switch 378 is in the "lock-out" position and is a logical "0" when the switch is in the "remote" position. Signal 98 may be referred to as the "lock-out" or "test mode" signal.

Conductor 386 also serves as the AC power supply bus to the various actuators associated with the driven devices of all of the burners 14a, 14b, 14c and 14d in an elevation. However, for the sake of brevity, only solenoids 44 and 46 which control actuation of a particular fuel gun 20 have been shown in FIG. 4. Solenoids 44 and 46 are connected in parallel circuits between AC supply conductor 386 and a conductor 392 at ground potential. AC switches 238 and 242 are respectively connected in each arm of the parallel circuits having solenoids 44 and 46. A separate AC switch is associated with each of the actuators 44 and 46 and likewise with the other actuators not shown in FIG. 4.

AC switches 238 and 242 are of a type which will respond to the presence of an enabling command signal, such as control system output signal 239 or 243, or the remaining system output signals not shown in FIG. 4, to close the circuit which provides AC driving potential across a particular one of the actuators. Each AC switch includes a gated switch element, such as triac 396, connected in series with an actuator such as solenoid 44 and the source of AC power at conductor 386. When a switching potential is applied to the control electrode 398 of triac 396 the triac will conduct, closing the power supply circuit to solenoid 44 and when the switching potential is removed the triac will cease conducting and open the power supply circuit. This arrangement permits use of the low voltage DC control system output signals to control the switching of triac 396 and accordingly energization or de-energization of the various actuators such as solenoid 44. AC switches 238 and 242, as depicted in FIG. 4, utilize a low voltage relay 400 actuated by a control system output signal such as 239 to close a contact 402 between control electrode 398 and the source of switching potential provided by resistor 404. The presence at the output of control system 92 of a command signal such as signal 239 is indicated by means such as low voltage lamp 406 connected in parallel with relay 400. When control system output signal 239 is present, a low voltage DC energizing potential is applied across lamp 406 to provide an indication of signal presence. It will be recognized that various other means may be used to signify and/or record the presence of the output signal.

The startup sequence for a burner elevation is as follows. A start command signal 100 sets the submode characterizing flip-flop 131 to that state indicating operation in the startup submode and providing signal 132. Substantially simultaneously and assuming the elevation permissives are satisfied as indicated by signal 142, signal 144 is provided as an input to sequencer and timer 150 which provides the output signals required to start ignitor 30 and to extend the fuel guns 20 and open fuel valves 24 associated with the various burners 14. Signal 154 is applied to each ignitor torch 30 in the elevation simultaneously and serves to ignite the several torches by concurrently opening fuel valves thereto and exciting the spark transformers 91. At 15 seconds each of the several ignitor torches 30 is examined through its respective "and" gate 188 to determine whether sufficient ignitor energy is present to ignite the fuel issuing from fuel gun 20. If there is insufficient ignitor energy at, say, the ignitor for burner 14a, signal 216 will not appear as a logical "1" and, accordingly, the "and" gate 264 will be prevented or inhibited from passing burner start signal 160a. If, as is usually the case, sufficient ignitor energy is present, it is so indicated by signal 216 and the startup sequence continues. Each burner 14a, 14b, 14c and 14d then receive their corresponding burner start signals 160a, 160b, 160c and 160d in the sequence in which they appear. Each burner, at its proper time within the sequence, then completes initiation of the startup procedure. This includes the generation of signal 270 when purge valve 28 is indicated as being closed, ignitor 30 is indicated as being "on" by signal 266, and upon receipt of the corresponding burner start signal 160. Signal 270 first acts through "and" gate 272 to provide control system output signal 236 to extend fuel gun 20 and upon extension of the fuel gun as indicated by signal 50', acts through "and" gate 278 and flip-flop 294 to provide control system output signal 248 which commands opening of the fuel valve 24. Upon complete execution of these commands, initiation of combustion will be effected at each burner and automatically throughout the entire elevation of burners.

The orderly shutdown of the burner elevation will occur either in response to an intentionally generated stop command signal or as the result of an indication that startup was not successfully initiated within the time period allotted. In the preferred embodiment, the latter indication is provided by signal 355 when flip-flop 131 is set in the startup submode, the startup time period has elapsed as indicated by signal 162, and signal 352 is present to signify that at least three out of four (3 out of 4) fuel valves did not open. It will be realized that signals provided by monitoring other driven devices such as the fuel gun 20 may serve to indicate failure of the complete startup operation. Stop command signal 102 sets flip-flop 131 to the shutdown submode substantially simultaneously and, assuming elevation permissives are satisfied, signal 148 is provided as an input to sequencer and timer 150 which provides the output signals required to start ignitors 30, close fuel valves 24, open and close purge valves 28, and retract fuel guns 20. Ignitor start signal 154 is provided as in the startup submode and concurrently energizes all of the ignitors 30 in the elevation. Beginning 15 seconds after the appearance of ignitor start signal 154 and continuing for 130 seconds thereafter, burner purge signals 166a, 166b, 166c and 166d appear in sequence beginning 15 seconds after the appearance of ignitor start signal 154 and continue until 145 seconds after the appearance of signal 154. A burner purge signal 166 provides signal 306 which first acts through flip-flop 294 to provide control system output signal 244 to close fuel valve 24 and upon an indication by signal 72' that the fuel valve is closed and an indication by signal 280 that fuel gun 20 is extended and an indication by signal 266 that ignitor 30 is "on", signal 306 acts through "and" gate 316 to provide control system output signal 258 which opens purge valve 28. Some period of time following the opening of purge valve 28 as determined by time delay element 340, flip-flop 336 provides signal 326. Signal 326 first acts through "or" gate 324 to provide control system output signal 254 which directs closing of purge valve 28 and upon closing of the purge valve 28, as indicated by signal 74', signal 326 acts through "and" gate 334 to provide control system output signal 240 which directs the retraction of fuel gun 20. At this point, combustion will have been terminated at each burner and automatically in sequence throughout the entire elevation of burners resulting in burner and elevation shutdown with the various flip-flops reset for subsequent startup.

When it is desired to perform a test of the logic incorporated in control system 92, the test will be initiated manually. Exercise of the logic will start from a condition in which a particular elevation of burners is completely shutdown and inactive. Principally, the test provides an automatic exercise of the logic through the complete startup and shutdown submodes. Means are also provided for initiating the shutdown submode of operation in the test mode in the event of a control logic failure in the startup logic. This shutdown capability is required only to reset the several flip-flops for a subsequent startup. In either event, some indication that the driven devices of the elevation are in the shutdown condition will be required prior to initiating the test mode exercise. Accordingly, when switch 378 is placed in the "lock-out" position to provide "lock-out" signal 98, a check is made to ascertain whether or not the elevation is in fact shutdown. Signal 98 is applied as one of the two inputs to "and" gate 408 with the other input being provided by signal 364. As previously described, signal 364 occurs when all of the fuel valves and all of the ignitors are "off", this being taken as an indication that the elevation is shutdown. The output of "and" gate 408 is a signal 410 which indicates elevation shutdown in the "lock-out" test mode and is applied as one of the two inputs to each of the "and" gates 412 and 414 to permit a "test" to be initiated.

Signals 98 and 368 are applied as the two inputs to "and" gate 428 which provides an output signal 430 when both inputs are in the logical "1" state. Signal 368 appears as a logical "1" whenever any one of the fuel burner valves or ignitors associated with all of the burners of the elevation is not in a shutdown or "off" condition. Signal 430 complements signal 410 in the test mode and will typically be connected to an indicator, not shown, to advise the operator that a test of the logic may not be conducted at the present time.

Push button 416, when actuated, provides test start pulse signal 418 applied to the other input of "and" gate 414. Push button 420, when actuated, provides a test stop pulse signal 422 applied to the other input of "and" gate 412. The output of "and" gate 414 is a signal 424 which is applied to an input of "or" gate 104 to provide a control system start signal 100. The output of "and" gate 412 is a signal 426 which is applied to an input of "or" gate 106 to provide a control system stop signal 102. Additionally, a signal 424 is applied as an input to "or" gate 373 to reset flip-flop 357 following a possible unsuccessful startup attempt.

Start and stop command signals 100 and 102 respectively, though now generated in the test mode of operation rather than remote or manual, serve to initiate the burner elevation startup and shutdown sequences in essentially the same manner as described above. The remaining logic in control system 92 utilized in the startup submode of operation is exercised as described above to provide control system output signals 154, 208, 236 and 244. The occurrence of these output signals will be indicated by indicating lamps 406 associated with the corresponding AC switches. However, because control system 92 is being exercised in the test or "lock-out" mode, "lock-out" switch 378 will have been placed in that position which grounds conductor 386. Conductor 386, it will be recalled, is that which normally supplies AC driving potential to the various driven devices. The grounding of conductor 386 removes the AC potential needed for actuation of the various driven elements of the ignitor 30, fuel gun 20, burner valve 24 and purge valve 28. Thus, these driven elements are incapable of responding to their corresponding output command signals and remain in a shutdown or "stop" condition.

Because the driven devices required to initiate combustion at the burners of the elevation have been prevented from responding to their command signals, their associated limit switches will also fail to move to the state directed by the command signals. This results in an indication by signal 352 that at least three out of four (and in fact four out of four) of the fuel valves 24 have not opened at the expiration of the startup submode trial period and in turn results in signal 355. Signal 355 acts through flip-flop 357 to indicate the unsuccessful startup attempt and to generate a stop pulse 369 which acts through "or" gate 106 to provide stop command 102.

Upon the occurrence of stop command 102, the logic of control system 92 will then be exercised through a routine shutdown operation resulting in control system output signals 154, 204, 248, 258, 254 and 240. Because the control system is in the test mode, and the AC switches have been grounded, these output command signals are incapable of directing the application of an AC energizing potential to the corresponding driven devices. At this point, a complete startup and shutdown exercise of the control logic will have been performed and control system 92 is available, with flip-flops reset, for a subsequent startup command in either the test mode or an operational mode.

The exercise of the logic of control system 92 through the startup and shutdown submodes in the test mode of operation is accomplished with substantially only that circuitry required to effect a burner elevation startup and shutdown sequence in the remote automatic or manual operational modes. However, certain signals are provided only after certain of the driven devices have in fact responded to their command signals and the inability of these driven devices to respond in the test mode require that their response, or rather a signal indicative of expected response, be simulated.

Need for simulated signals occurs at "or" gates 268, 282, and 337. Each of these "or" gates normally provides an output signal in the logical "1" state upon response of some driven device to its associated command signal. "Or" gate 268 provides signal 266 as an input to "and" gate 264 when signal 216 indicates that the ignitor 30 is "on". "Or" gate 282 provides signal 280 as an input to "and" gates 278 and 316 when limit switch signal 50' indicates that fuel gun 20 is fully extended. "Or" gate 337 provides signal 339 which ultimately sets flip-flop 336 a delayed time following the opening of purge valve 28, as indicated by limit switch signal 76'. In each instance, the output signal of these "or" gates is required for continuing the startup or shutdown sequence. Accordingly, signals which simulate the occurrence of the required inputs to the three mentioned "or" gates are provided and applied to the "or" gates for use in the test mode of operation.

"Test mode" or "lock-out" signal 98 is in the logical "1" state for the duration of the test mode and is therefore used for the simulation of the required inputs to the above mentioned "or" gates during the test mode. Signal 98 is applied as an input to both "or" gates 268 and 280. In deriving a signal for simulating signal 76', "lock-out" signal 98 and control system output signal 258 are applied as the two inputs to "and" gate 432 to provide, as the output therefrom, signal 434 which is applied as an input to "or" gate 337. Signal 434 exists during the test mode only when signal 258 is present. This latter provision insures that signal 338 is not continuously present as an input to flip-flop 336 so that signal 304 may reset the flip-flop when it occurs. Signal 258 normally directs the opening of purge valve 28, and accordingly the closing of limit switch 76 to provide signal 76'. Therefore, it is in the correct time position in the operational sequence to aid in the simulation of signal 76'. In the instance of the simulated signals applied to "or" gates 268 and 282, the continued presence of signal 98 as an input throughout the startup and shutdown submodes in no way interferes with the proper functioning of the remaining logic.

Thus it will be seen that a complete exercise of the logic of control system 92 can be executed in the test mode and provide a complete check of the logic with but a minimum of human intervention and changes in the circuitry.

It will be understood that the embodiment shown and described herein is merely illustrative and that changes may be made without departing from the scope of the invention as claimed.

What is claimed is:

1. In a system for controlling a fuel burner arrangement having a plurality of electrically actuated means for initiating and for terminating a combustion process, control means adapted to function in an operational mode and in a test mode and responsive in both said modes to a start command for automatically providing in a predetermined sequence at outputs thereof a plurality of commands for actuating said combustion process initiating means and responsive in both said modes to a stop command for automatically providing in a predetermined sequence at outputs thereof a plurality of commands for actuating said combustion process terminating means; means for generating said start command; means for generating said stop comstart command; means for selectively directing operation of said system in a said operational mode or in a said test mode including means for preventing actuation of said combustion initiating and terminating means in response to their corresponding said actuating signals in said test mode; and means for indicating the presence of said actuating commands at the said outputs of said control means whereby the integrity of said control means is verified.

2. The apparatus of claim 1 including sensing means for providing signals indicative of the response of said combustion initiating and terminating means to their corresponding said actuating commands; and said control means include means for providing a signal indicative of unsuccessful initiation of combustion when said sensing means indicates a response inconsistent with combustion initiation upon expiration of a predetermined period of time following generation of said start command and wherein said stop command generating means are responsive to said signal indicative of unsuccessful initiation of combustion to generate a said stop command in said operational mode and in said test mode.

3. The apparatus of claim 2 wherein each of said means for actuating said combustion initiation and combustion terminating means includes an electrically responsive actuator and each of said actuators is connected to a source of energizing electrical power by a series circuit which includes said actuator, first switch means adapted for closing when the corresponding said actuating command is present at an output of said control means and opening when the corresponding said actuating command is absent and second normally closed switch means adapted to open when said control means are operated in said test mode, thereby preventing actuation of said combustion initiation and terminating means.

4. Apparatus of claim 2 wherein said fuel burner arrangement has a movable fuel gun, a fuel supply valve, a burner purge valve and an ignitor torch; said electrically actuated means for initiating and for terminating a combustion process comprise electrically actuated fuel gun moving means adapted to extend and to retract said gun upon command, an electrically actuated fuel supply valve operator adapted to open and to close said fuel supply valve upon command, an electrically actuated burner purge valve operator adapted to open and to close said burner purge valve upon command and electrically actuated means for ingiting and for extinguishing said ignitor torch upon command; and said sensing means utilized for indicating a response inconsistent with initiation of combustion include means for indicating the operative position of said fuel supply valve, said fuel supply valve being required to be open for initiation of combustion.

5. The apparatus of claim 4 wherein said fuel burner arrangement includes a plurality of fuel guns and associated fuel supply valves, burner purge valves and ignitor torches; said control means include means for providing said actuating commands to each of the plurality of fuel gun moving means and associated burner purge valve operators, fuel supply valve operators and ignitor torch igniting and extinguishing means in a predetermined sequence in response to said start and stop commands; said fuel supply valve position sensing means are associated with each of said plurality of fuel supply valves; and means responsive to said indications of fuel supply valve operative positions provide said signal indicative of unsuccessful initiation of combustion when a majority of said fuel supply valves are not opened.

6. The apparatus of claim 4 wherein said sensing means further include ignition sensing means associated with said ignitor torch for providing a signal indicative of the state of ignition of said ignitor torch; said control means include first means for providing said command to extend said fuel gun and said command to open said fuel valve only upon receiving a signal indicating ignition of said ignitor torch; and including means for simulating said signal indicating ignition of said ignitor torch when said control means are operated in said test mode, said simulated signal being connected to said first means.

7. The apparatus of claim 6 wherein said sensing means further include gun position sensing means associated with said fuel gun and purge valve position sensing means associated with said burner purge valve for providing, respectively, signals indicative of the operative states of said fuel gun and said purge valve; said control means include second means for providing said command to retract said gun only upon receiving a signal indicating extension of said gun and third means for providing said command to close said purge valve only upon receiving a signal indicating said purge valve as open; and including means for simulating said signals indicative of the fuel gun extended and purge valve open conditions when said control means are operated in said test mode, said signals being connected to said second and third means, respectively.

8. A system for controlling a fuel burner arrangement having a movable fuel gun, a fuel supply valve, a burner purge valve and an ignitor torch; electrically actuated fuel gun moving means adapted to extend and to retract said gun upon command; an electrically actuated fuel supply valve operator adapted to open and to close said fuel supply valve upon command; an electrically actuated burner purge valve operator adapted to open and to close said burner purge valve upon command; electrically actuated means for igniting and for extinguishing said ignitor torch upon command; sensing means including fuel valve position sensing means for providing a signal indicative of the operative position of said fuel supply valve; decision logic means adapted to function in an operational mode and in a test mode and having means responsive to a start command for generating a signal indicative of operation in a start-up submode and responsive to a stop command for generating a signal indicative of operation in a shutdown submode, means responsive to said start command for generating a signal indicative of a predetermined time span for said startup submode, means responsive to said stop command for generating a signal indicative of a predetermined time span for said shutdown submode, means for providing within said startup time span in response to said start command and in a predetermined sequence at respective outputs of said decision logic means a command signal to ignite said ignitor torch, a command signal to extend said fuel gun and a command signal to open said fuel supply valve and for providing within said shutdown time span in response to said stop command and in a predetermined sequence at respective outputs of said decision logic means a command signal to close said fuel supply valve, a command signal to open said burner purge valve, a command signal to close said burner purge valve, a command signal to retract said fuel gun and a command signal to extinguish said ignitor torch, and logic means responsive to said indication of fuel valve position, said indication of said startup submode and said indication of said startup time span for providing an output signal indicative of an unsuccessful start when said fuel valve is not open at the expiration of said startup time span in said startup submode; means for generating said start command; means responsive to at least said signal indicative of an unsuccessful start for generating said stop command; switch means responsive to operation of said decision logic means in said test mode for preventing actuation of said fuel gun moving means, said ignitor torch actuating means, said fuel valve operator and said purge valve operator in response to their corresponding command signals; and means for indicating the presence of said command signals at their respective said outputs of said decision logic means whereby the integrity of said logic is verified.

9. The apparatus of claim 8 wherein said sensing means further include ignition sensing means associated with said ignitor torch, gun position sensing means associated with said fuel gun and purge valve position sensing means associated with said burner purge valve for providing, respectively, signals indicative of the state of ignition of said ignitor torch, the operative state of said fuel gun and the operative state of said purge valve; said decision logic means inclue first, second, and third logic means for, respectively, providing said command signal to extend said fuel gun and open said fuel valve only upon receiving a signal indicating ignition of said ignitor torch, providing said command signal to retract said gun only upon receiving a signal indicating extension of said gun, and providing said command signal to close said purge valve only upon receiving a signal indicating said purge valve as being open; and including means for simulating said signals indicative of the ignited state of said ignitor torch, the extended position of said gun and the valve open position of said purge valve when said decision logic means are operated in said test mode, said simulated signals being respectively connected as inputs to said first, second and third logic means.

10. The apparatus of claim 8 wherein said fuel gun moving means includes first and second electrically responsive actuators for advancing and retracting respectively said fuel gun; said fuel supply valve operator includes third and fourth electrically responsive actuators for opening and closing respectively said fuel supply valve; said burner purge valve operator includes fifth and sixth electrically responsive actuators for opening and closing respectively said burner purge valve; said ignitor torch igniting and extinguishing means includes seventh and eighth electrically responsive actuators for igniting and extinguishing respectively said ignitor torch; and each of the said eight electrically responsive actuators is connected to a source of electrical power by a series circuit which includes said electrically responsive actuators, first switch means adapted for closing when a corresponding said actuating command is present at an output of said decision logic means and for opening when the corresponding said actuating command is absent and second normally closed switch means adapted to open when said decision logic means are operated in said test mode for preventing response of said actuator to its corresponding command.

11. The apparatus of claim 8 wherein said indicating means comprise: an electrically energized light source associated with each of said decision logic means command signal outputs; means connecting each said light source to a supply of electrical energy; and each said connecting means including switch means in series therewith for closing the circuit to said light when the corresponding command signal is present at its corresponding output of said logic means.

* * * * *